No. 810,835. PATENTED JAN. 23, 1906.
H. AUSTIN.
APPARATUS FOR HEATING PROPAGATING BEDS.
APPLICATION FILED JAN. 31, 1905.
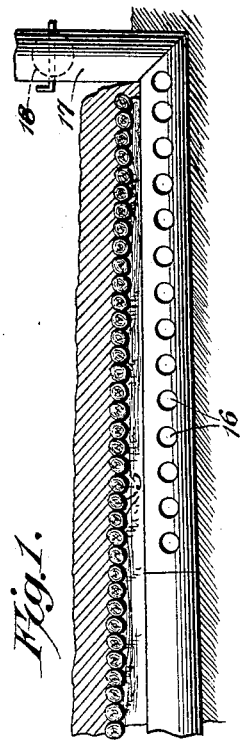
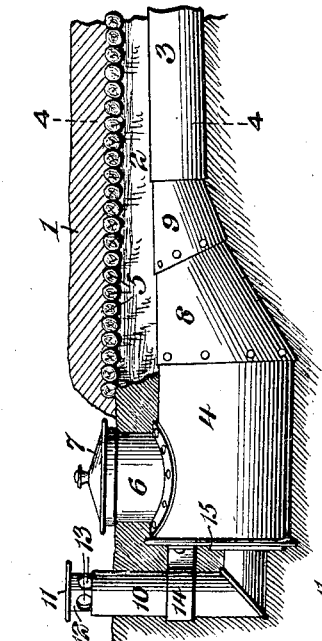
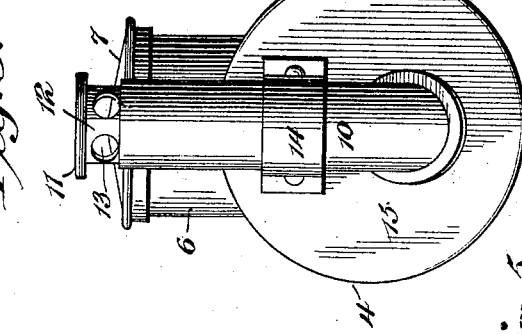
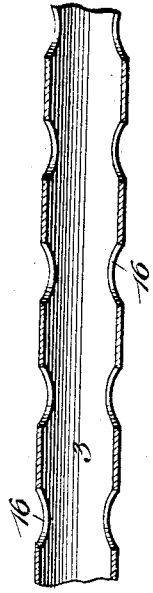
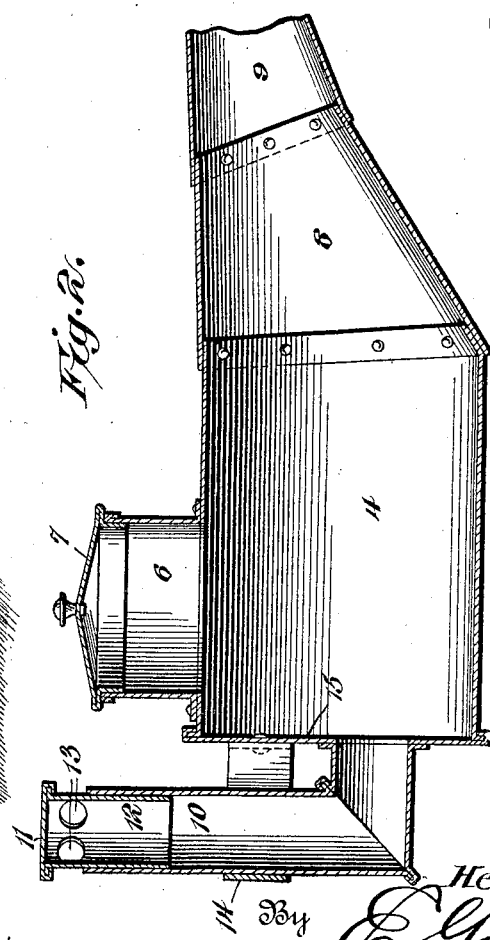
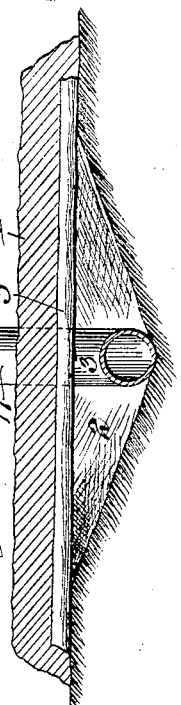
Witnesses
Howard D. Orr
J. H. Riley
Inventor,
Henry Austin,
By E. G. Siggers
Attorney

UNITED STATES PATENT OFFICE.

HENRY AUSTIN, OF FELTON, DELAWARE.

APPARATUS FOR HEATING PROPAGATING-BEDS.

No. 810,835.　　　　Specification of Letters Patent.　　　　Patented Jan. 23, 1906.

Application filed January 31, 1905. Serial No. 243,514.

*To all whom it may concern:*

Be it known that I, HENRY AUSTIN, a citizen of the United States, residing at Felton, in the county of Kent and State of Delaware, have invented a new and useful Apparatus for Heating Propagating-Beds, of which the following is a specification.

The invention relates to improvements in apparatus for heating propagating-beds.

The object of the present invention is to improve the construction of apparatus for heating propagating-beds and to provide a simple, inexpensive, and efficient apparatus for supplying heat for hot-beds for starting and forcing early vegetables and to enable the draft to be controlled, so that the apparatus may be safely left without attention for a considerable length of time.

A further object of the invention is to provide an apparatus in which a comparatively small amount of fire will effectually heat large propagating-beds and to provide means for preventing the plants close to the fire from receiving too much heat and those remote from the fire receiving too little heat.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a longitudinal sectional view of a propagating-bed having a heating apparatus constructed in accordance with this invention and shown in side elevation. Fig. 2 is a longitudinal sectional view of the inner portion of the apparatus. Fig. 3 is an end elevation of the same. Fig. 4 is a transverse sectional view on the line 4 4 of Fig. 1. Fig. 5 is a detail horizontal sectional view of the outer portion of the heat-conduit, illustrating the arrangement of the lateral discharge-openings.

Like numerals of reference designate corresponding parts in all the figures of the drawing.

1 designates a hot-bed designed in practice to be fifty feet in length and ten feet in width; but it may be of any other desired area, as will be readily understood. Beneath the bed is arranged a longitudinal chamber 2, in which is located a longitudinal heat-conduit 3, extending from a horizontal furnace or heater 4, and the latter is located below and extends beyond one end of the bed, as clearly shown in Fig. 1 of the drawings. In constructing the hot-bed a trench is dug and is covered with transversely-arranged poles 5, which support the hot-bed 1.

The furnace or heater 4, which is preferably cylindrical, is embedded in the ground and is designed for burning wood; but any other fuel may be employed. The furnace is provided with a vertical cylindrical fuel-inlet 6, having a removable top or cover 7 and extending above the surface of the ground. The cover is adapted to be removed for the introduction of fuel. The heat-conduit extends longitudinally from and merges into the furnace or heater 4, being provided adjacent to the same with tapering substantially truncoconical sections 8 and 9.

Air is admitted to the outer end of the furnace by a substantially L-shaped inlet-pipe 10, having a short horizontal arm and a vertical arm, which extends from the lower portion of the heater or furnace to a point above the surface of the ground. The air-inlet pipe is provided at its upper or outer end with means for controlling the admission of air. This means consists of a cap 11, having a tubular portion 12 extending into the upper end of the air-inlet pipe and provided with an annular series of apertures 13, adapted to permit air to enter the pipe 10. The size of the apertures may be controlled by raising or lowering the cap 11, which telescopes into the air-inlet pipe. The upwardly-extending branch or portion of the air-inlet pipe is supported by a brace 14 of sheet metal or other suitable material, which embraces the air-inlet pipe and which has its terminals secured to the outer end or head 15 of the furnace or heater, as clearly illustrated in Fig. 3 of the drawings.

The heat-conduit, which rests upon the bottom of the chamber beneath the hot-bed, is spaced from the latter and is arranged at an inclination, the distance from the conduit to the hot-bed gradually decreasing as the distance from the fire increases. The outer portion of the heat-conduit is provided with lateral discharge-openings 16, which permits the heat to enter the space beneath the hot-bed. By inclining the heat-conduit and by providing the discharge apertures or openings at the outer portion thereof the plants located adjacent to the heater or furnace are prevented from receiving too much heat and those remote from the heater or furnace are afforded a sufficient amount of heat. The heat escaping from the lateral outlets enters the chamber or space and heats the air within the same. This chamber or space tapers transversely and extends close to the sides of the bed, which is uniformly heated. The conduit is connected at its upper or outer end with an outlet or escape pipe 17, having a damper 18. By adjusting the damper and the cap 11 the draft may be controlled and the apparatus may be supplied with fuel in the evening, and it will not require attention until the next morning. It is especially adapted for supplying heat for hot-beds for starting and forcing early vegetables.

Having thus fully described my invention, what I claim as new, and desire to secure by Letters Patent, is—

1. An apparatus of the class described, comprising a furnace or heater adapted to be located beneath the surface of the ground and provided at the top with a fuel-inlet, an air-inlet located at one end of the furnace or heater, and a heat-conduit extending from the other end of the furnace or heater, said heat-conduit being arranged to extend beneath a hot-bed.

2. An apparatus of the class described, comprising a furnace or heater adapted to be located beneath the surface of the ground, a heat-conduit extending longitudinally from one end of the furnace or heater and arranged to extend beneath a hot-bed and provided at its outer portion with an outlet, and an upwardly-extending air-inlet located at the other end of the furnace or heater.

3. An apparatus of the class described, comprising a furnace or heater provided at the top with a fuel-inlet and adapted to be located beneath the surface of the ground, a heat-conduit extending longitudinally from one end of the furnace or heater and arranged to extend beneath a hot-bed and provided at its outer portion with an outlet, and an upwardly-extending air-inlet located at the other end of the heater or furnace and being of a diameter less than the heat-conduit.

4. An apparatus of the class described, comprising a substantially horizontal furnace or heater provided at the top with a fuel-inlet and adapted to be located beneath the surface of the ground, a heat-conduit extending longitudinally from one end of the furnace or heater, an upwardly-projecting air-inlet extending from the other end of the furnace or heater, and an escape-pipe connected with and extending upward from the outer end of the heat-conduit.

5. An apparatus of the class described, comprising a furnace or heater provided at the top with a fuel-inlet and adapted to be located beneath the surface of the ground and provided with an air-inlet, a heat-conduit extending from one end of the furnace or heater and arranged to extend beneath a hot-bed, said heat-conduit being arranged at an inclination and extended upwardly and outwardly, whereby the distance between it and a hot-bed decreases as the distance from the furnace increases, and an outlet located at the outer end of the heat-conduit.

6. An apparatus of the class described, comprising a furnace or heater, a heat-conduit adapted to be located beneath a hot-bed and extending upward and outward at an inclination so as to approach the hot-bed as it recedes from the furnace or heater and provided with an imperforate inner portion and having openings at its outer portion, an air-inlet connected with the furnace or heater, and an escape-pipe extending from the outer end of the heat-conduit.

7. An apparatus of the class described, comprising a furnace or heater adapted to be located beneath the surface of the ground and provided at the top with a vertical fuel-inlet having an exterior cover, an air-inlet pipe connected with the outer end of the furnace or heater and extending to a point above the ground and provided with means for controlling the draft, a longitudinal heat-conduit connected with the other end of the furnace or heater and arranged to extend beneath a hot-bed, and an outlet at the outer portion of the heat-conduit.

In testimony that I claim the foregoing as my own I have hereto affixed my signature in the presence of two witnesses.

HENRY AUSTIN.

Witnesses:
HARRY C. LYNCH,
WALTER J. HARRINGTON.